United States Patent
Riou

(10) Patent No.: US 9,092,621 B2
(45) Date of Patent: Jul. 28, 2015

(54) METHOD OF DETECTING FAULT ATTACK

(71) Applicant: SAMSUNG ELECTRONICS CO., LTD., Suwon-si (KR)

(72) Inventor: Sebastien Riou, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 13/939,792

(22) Filed: Jul. 11, 2013

(65) Prior Publication Data

US 2014/0020097 A1  Jan. 16, 2014

(30) Foreign Application Priority Data

Jul. 12, 2012 (KR) .......................... 10-2012-0076105

(51) Int. Cl.
*G06F 12/14*  (2006.01)
*H03M 13/09*  (2006.01)
*G06F 21/55*  (2013.01)

(52) U.S. Cl.
CPC .................................... *G06F 21/554* (2013.01)

(58) Field of Classification Search
None
See application file for complete search history.

(56) References Cited

U.S. PATENT DOCUMENTS

| 6,085,350 A | 7/2000 | Emmert et al. |
| 2006/0026457 A1* | 2/2006 | Bernstein et al. ................. 714/6 |
| 2008/0094220 A1 | 4/2008 | Foley et al. |
| 2010/0318885 A1* | 12/2010 | Lisart et al. .................... 714/805 |
| 2013/0283115 A1* | 10/2013 | Sazeides et al. ............... 714/752 |

FOREIGN PATENT DOCUMENTS

| JP | 3895118 B2 | 3/2007 |
| JP | 2009003785 A | 1/2009 |

* cited by examiner

*Primary Examiner* — Kaveh Abrishamkar
(74) *Attorney, Agent, or Firm* — Sughrue Mion, PLLC

(57) ABSTRACT

In a method of detecting a fault attack in a secure memory device, payload data is initialized by determining whether the payload data is consistent. The payload data is stored in a plurality of ephemeral registers included in the secure memory device. A count value included in the payload data is increased by detecting whether a fault is injected in the secure memory device from outside, during a processing operation of secure data, stored in the secure memory device. It is determined whether the fault injected in the secure memory device from the outside is caused by the fault attack based on the count value and a threshold value.

20 Claims, 13 Drawing Sheets

METHOD OF DETECTING FAULT ATTACK

CROSS-REFERENCE TO RELATED APPLICATION

This application claims priority to Korean Patent Application No. 2012-0076105, filed on Jul. 12, 2012, in the Korean Intellectual Property Office (KIPO), the contents of which are herein incorporated by reference in their entirety.

BACKGROUND

1. Technical Field

Example embodiments relate to a security of data. More particularly, embodiments relate to a method of detecting a fault attack in a secure memory device.

2. Description of the Related Art

A secure memory device, e.g., a smart card, may process secure data, such as cryptographic keys, sensitive data, or sensitive codes. However, errors may occur in the secure data due to external malicious attack or problems of the secure memory device itself. For example, the data stored in the secure memory device may be lost or may be corrupted by the fault-based attack, in which faults are repeatedly injected into the data by a laser or an X-ray. In addition, the data stored in the secure memory device may be changed due to a single event upset (SEU), temporarily occurring according to an operating environment of the secure memory device.

SUMMARY

Accordingly, exemplary embodiments are provided to obviate one or more problems due to limitations and disadvantages of the related art.

Exemplary embodiments may provide a method of detecting a fault attack capable of distinguishing between the fault attack and a single event upset.

An aspect of an exemplary embodiment is directed to a method of detecting a fault attack in a secure memory device, payload data is initialized by determining whether the payload data is consistent. The payload data is stored in a plurality of ephemeral registers included in the secure memory device. A count value included in the payload data is increased by detecting whether a fault is injected in the secure memory device from outside, during a processing operation of secure data, stored in the secure memory device. It is determined whether the fault injected in the secure memory device from the outside is caused by the fault attack based on the count value and a threshold value.

The payload data may further include an error detection code (EDC) value corresponding to the count value. The count value may include a plurality of count bits, and the EDC value may include a plurality of EDC bits. In the step of initializing the payload data, it is determined whether a first count bit of the plurality of count bits matches with first EDC bits of the plurality of EDC bits. The first EDC bits may correspond to the first count bit.

In the step of initializing the payload data, the payload data may be maintained at a previous logic state if the first count bit matches with the first EDC bits. The payload data may be initialized if the first count bit does not match with the first EDC bits.

The payload data may be maintained at the previous logic state if the secure memory device is powered on within a data retention time of the ephemeral registers. The payload data may be initialized if the secure memory device is powered on after the data retention time of the ephemeral registers has elapsed.

In the step of increasing the count value, the count value may be maintained to a previous value if the fault is not injected in the secure memory device. The count value may be increased if the fault is injected in the secure memory device.

In the step of determining whether the fault is caused by the fault attack, it may be determined that the fault is caused by a single event upset (SEU) if the count value is less than or equal to the threshold value. It may be determined that the fault is caused by the fault attack if the count value is greater than the threshold value.

In the method of detecting a fault attack, the payload data may be further initialized if the fault is not injected in the secure memory device from the outside within a reference time period.

In the method of detecting a fault attack, the processing operation of the secure memory device may be terminated.

In the step of terminating the processing operation of the secure memory device, the processing operation of the secure memory device may be reset if the fault is determined as being caused by a SEU. The processing operation of the secure memory device may be terminated if the fault is determined as being caused by the fault attack.

In an example embodiment, the secure memory device may include a security detector and a processor. The security detector may generate a detection signal by detecting whether the fault is injected in the secure memory device, and may generate an alarm signal indicating whether the fault is caused by the fault attack. The processor may control the operation of the secure memory device, may increase the count value based on the detection signal, and may terminate the processing operation of the secure memory device based on the alarm signal.

In an example embodiment, the secure memory device may include a security detector, a register controller, and a processor. The security detector may generate a detection signal by detecting whether the fault is injected in the secure memory device. The register controller may increase the count value based on the detection signal, and may generate an alarm signal indicating whether the fault is caused by the fault attack. The processor may control the operation of the secure memory device, and may terminate the processing operation of the secure memory device based on the alarm signal.

Each ephemeral register of the ephemeral registers may include a storage block, a first diode, a second diode, and a power supply block. The storage block may store at least one of a plurality of bits included in the payload data. The first diode may be connected between the storage block and a terminal of a first voltage. The second diode may be connected between the storage block and a terminal of a second voltage. The power supply block may be connected in parallel with the storage block, and supplies power to the storage block.

The storage block may include a flip-flop or a latch, and the power supply block may include a capacitor.

A data retention time of each ephemeral register may be determined based on a structure of the storage block and a charge storage characteristic of the power supply block.

An aspect of another exemplary embodiment is directed to a method of detecting a fault attack in a secure memory device, a first determination result is generated, by initializing first payload data as a result of determining whether the payload data is consistent, increasing a first count value included in the first payload data as a result of detecting whether a fault is injected in the secure memory device from outside during a processing operation of secure data, stored in the secure memory device, and determining whether the fault is caused by the fault attack based on the first count value and a first threshold value. The first payload data is stored in a plurality of first ephemeral registers included in the secure memory device. A second determination result is generated, by initializing second payload data as a result of determining whether the second payload data is consistent, increasing a second count value included in the second payload data as a result of detecting whether the fault is injected in the secure memory device from the outside during the processing operation of the secure data, stored in the secure memory device, and determining whether the fault is caused by the fault attack based on the second count value and a second threshold value, different from the first threshold value. The second payload data is stored in a plurality of second ephemeral registers included in the secure memory device. A data retention time of the second ephemeral registers is different from a data retention time of the first ephemeral registers. The processing operation of the secure memory device is terminated based on the first determination result and the second determination result.

An aspect of another exemplary embodiment is directed to a method of detecting a fault attack in a secure memory device including determining whether a first count bit, of a plurality of count bits, matches with a plurality of first EDC bits corresponding with the first count bit. Payload data is initialized if the first count bit does not match the first EDC bits. It is detected whether a fault is injected in the secure memory device from outside during a processing operation of the secure memory device. A count value, included in the payload data, is increased when the fault is injected in the secure memory device. It is determined whether the fault injected in the secure memory device from the outside is a single event upset (SEU) or the fault attack.

As described above, according to the method of detecting the fault attack of the exemplary embodiments, the fault attack can be effectively distinguished from a single event upset (SEU) by using a payload data stored in a plurality of ephemeral registers retaining data for shorter time, even if power supplied to the registers is shut off. In addition, a selective initialization operation of the payload data, a selective increase operation of a count value, and a determination operation of the fault attack are repeatedly performed whenever starting to supply power to the secure memory device and/or whenever resetting the secure memory device (i.e., by tracing the number of times of power on/off for the secure memory device). Thus, the fault attack is distinguished from the SEU.

DETAILED DESCRIPTION OF THE EXEMPLARY EMBODIMENTS

Figure 1:
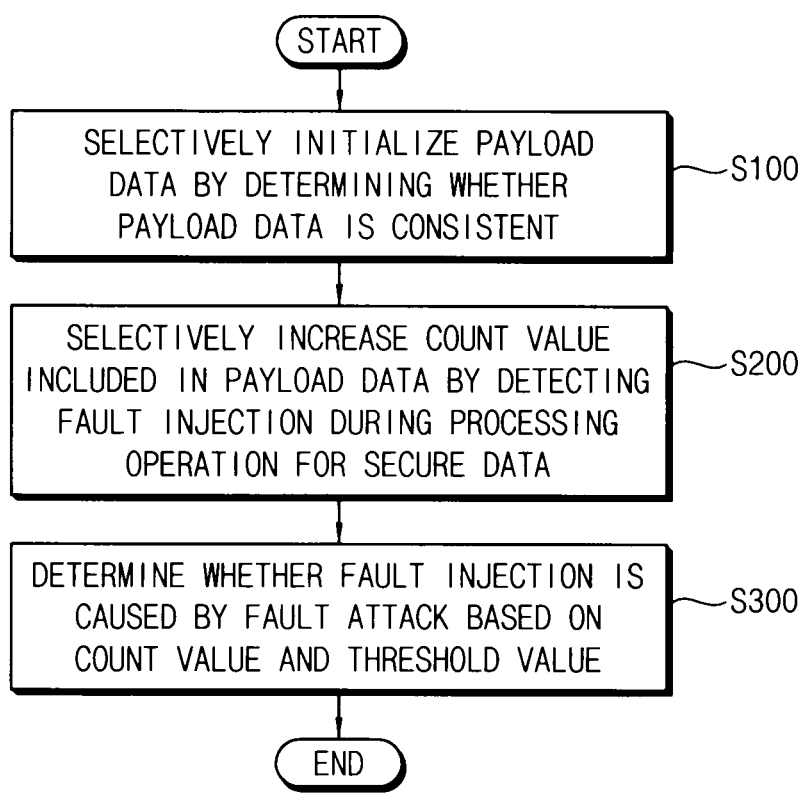
FIG. 1 is a flowchart illustrating a method of detecting a fault attack according to one exemplary embodiment.

Various example embodiments will be described more fully with reference to the accompanying drawings, in which embodiments are shown. Exemplary embodiments may, however, be embodied in many different forms and should not be construed as limited to the embodiments set forth herein. Rather, these embodiments are provided so that this disclosure will be thorough and complete, and will fully convey the scope of the exemplary embodiments to those skilled in the art Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the exemplary embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the exemplary embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which these exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flowchart illustrating a method of detecting a fault attack according to one exemplary embodiment.

The method of detecting the fault attack according to exemplary embodiments can be used to distinguish between fault attacks and single event upsets (SEUs), in a secure memory device such as a smart card that processes data requiring security. The fault attacks may be repeated by hackers, and the SEUs may temporarily occur based on an operating environment of the secure memory device. Although exemplary embodiments focus on the smart card, the method of detecting the fault attack may be used in various secure memory devices and/or various integrated circuits to process data requiring security. The detailed structure of the secure memory device will be described with reference to FIGS. 2, 4, and 11.

Referring to FIG. 1, in the method of detecting the fault attack according to one example embodiment, when power is supplied to the secure memory device or when the operation of the secure memory device is reset, the payload data is selectively initialized by determining whether the payload data is consistent (step S100). The payload data may be stored in a plurality of ephemeral registers, included in the secure memory device, and may be used to detect the fault attack. Unlike a related art nonvolatile memory, as described with reference to FIGS. 2 and 3, unlike a typical nonvolatile memory, the ephemeral register may store data for a predetermined data retention time, even if power is shut off. The ephemeral register may have a data retention time shorter than that of the related art nonvolatile memory.

A count value, included in the payload data, is selectively increased by detecting whether a fault is injected into secure data, stored in the secure memory device, from an outside of the secure memory device during a processing operation for the secure data (step S200). Based on the count value and a threshold value, it is determined whether the fault injected in the secure memory device from the outside is caused by the fault attack (step S300). For example, if the fault is injected exceeding a preset frequency (e.g., more than the predetermined number), the secure memory device may determine that the fault injected from the outside is caused by the fault attack. However, if the fault is injected at the preset frequency or less (e.g., equal to or less than the predetermined number), the secure memory device may determine that the fault injected from the outside is caused by the SEU.

Since the secure memory device stores and processes data requiring security (e.g., secure data), the secure memory device may be easily attacked by hackers. For instance, the secure memory device may be subject to the fault attack. The fault attack occurs when faults are repeatedly injected using a laser or an X-ray. When the fault attack is attempted, a great number of faults are injected into the secure memory device. In this case, hackers shut off power supplied to the secure memory device, or reset the operation of the secure memory device between the attempts of the fault injection, so that a user cannot recognize the hacking attempt. Since the fault attack may cause the loss or the corruption of the secure data, the secure memory device needs to be equipped with a device capable of preventing the attack or fault from the outside, as well as taking countermeasures (e.g., stopping of data processing or deletion of data) by detecting the data faults that have already occurred. Unlike the fault attack, the secure data may be changed by the SEU, which temporarily occurs due to the operating environment of the secure memory device. However, the data error, caused by the SEU may be disregarded, because it rarely exerts an influence upon the normal operation of the secure memory device. Therefore, if the countermeasures are carried out, regardless of if the error occurs by the single event upset, the operation performance of the secure memory device may be degraded.

To distinguish between the fault attack and the SEU, a related art secure memory device adopts the time redundancy scheme, that executes the same operation at least twice using one circuit and compares the results, or the hardware redundancy scheme that performs the same operation using at least two same circuits and compares the results. However, the related art secure memory device using the time redundancy scheme may have low operating speed, and the related art secure memory device using the hardware redundancy scheme may have a large size, Further, power consumption is increased in both related art schemes.

According to the method of detecting the fault attack of example embodiments, the fault attack can be distinguished from the SEU, based on payload data stored in a plurality of ephemeral registers capable of retaining data for a shorter time, even if the power is shut off. Accordingly, even if the fault attack is attempted through the repetition of power on/off, the fault attack can be effectively distinguished from the SEU. In addition, the secure memory device capable of effectively distinguishing the fault attack from the SEU can be implemented without reducing the operating speed of the secure memory device, enlarging the size of the secure memory device, and/or increasing the power consumption.

Hereinafter, the method of detecting the fault attack, according to example embodiments, will be described in more detail with reference to the structure of the secure memory device.

Figure 2:
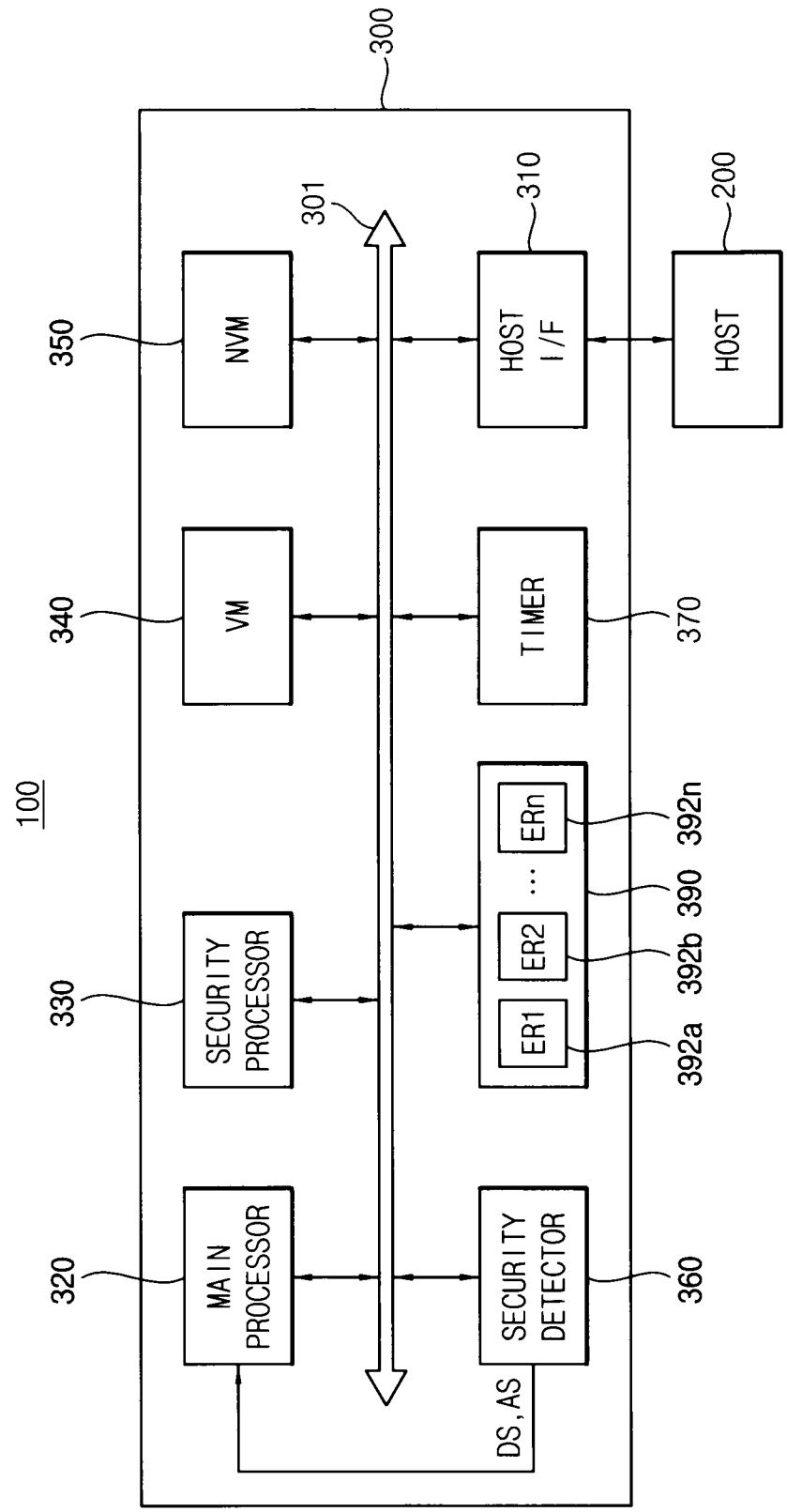
FIG. 2 is a block diagram illustrating a system including a secure memory device according to one exemplary embodiment.

FIG. 2 is a block diagram illustrating a system including a secure memory device according to one exemplary embodiment.

Referring to FIG. 2, a system 100 includes a host 200 and a secure memory device 300.

The secure memory device 300 includes a host interface (I/F) 310, a main processor 320, a security processor 330, a volatile memory (VM) 340, a nonvolatile memory (NVM) 350, a security detector 360, a timer 370, and a register unit 390. The components may be electrically connected with each other through an internal bus 301 to transceive signals. For instance, the secure memory device 300 may include a smart card.

The host interface 310 is connected with the host 200. The main processor 320 may make communication with the host 200 through the host interface 310. The host interface 310 may be configured to communicate with the host 200 using at least one of various interface protocols, such as a universal serial bus (USB) protocol, a multi-media card (MMC) protocol, a peripheral component interconnect-express (PCI-E) protocol, a serial-attached SCSI (SAS) protocol, a serial advanced technology attachment (SATA) protocol, a parallel advanced technology attachment (PATA) protocol, a small computer system interface (SCSI) protocol, an enhanced small disk Interface (ESDI) protocol, an integrated drive electronics (IDE) protocol, etc.

The main processor 320 controls the overall operations of the secure memory device 300. For example, the main processor 320 may control the volatile memory 340, the nonvolatile memory 350, the security detector 360, the timer 370 and the register unit 390, and may fetch instructions and data to process the fetched instructions and the fetched data. The main processor 320 may include a microprocessor or a central processing unit (CPU).

The security processor 330 may be resistant against tampering attacks, such as micro-probing, a software attack, eavesdropping, a fault generation attack, etc. According to one example embodiment, the main processor 320 and the security processor 330 may be implemented as mutually different integrated circuits or chips. According to another example embodiment, the security processor 330 may be integrated in the main processor 320, as a processing block of the main processor 320.

The main processor 320 and/or the security processor 330 may process secure data such as a cryptographic key, sensitive data, and a sensitive code. During the processing operation for the secure data, if the fault is injected due to the SEU, the main processor 320 may reset the operation of the secure memory device 300. If the fault is injected due to the fault attack, the main processor 320 may terminate the operation of the secure memory device 300.

The volatile memory 340 may act as a cache memory, or a working memory for the main processor 320. For example, the volatile memory 340 may be implemented by a DRAM, a SRAM, a mobile DRAM, etc.

The nonvolatile memory 350 may store a boot image, which is primarily executed substantially when power is supplied to the secure memory device 300, secure data and/or other normal data. For example, the nonvolatile memory 350 may be implemented by an electrically erasable programmable read-only memory (EEPROM), a flash memory, a PRAM, a RRAM, a MRAM, a FRAM, a nano floating gate memory (NFGM), a polymer random access memory (PoRAM), etc.

The security detector 360 may detect whether the fault is injected from the outside to generate a detection signal DS, and to generate an alarm signal AS to represent the fault attack. For example, the security detector 360 may include a fault detector, a power glitch detector, a laser detector, an abnormal condition detector, a reset detector, a metal shield, a data path encryption, a true random number generator, etc. In some example embodiments, the security processor 330 and the security detector 360 may be implemented as separate integrated circuits or chips. In other example embodiments, the security detector 360 may be built in the security processor 330 as a detecting block.

The register unit 390 stores the payload data used to detect the fault attack. The register unit 390 may include a plurality of ephemeral registers 392a, 392b, . . . , and 392n. As described below with reference to FIGS. 6A, 6B, and 6C, the payload data include a plurality of bits, including a count value and an error detection code (EDC) value corresponding to the count value. Each of the ephemeral registers 392a, 392b, . . . , and 392n may store at least one of the bits included in the payload data. For instance, each of the ephemeral registers 392a, 392b, . . . , and 392n may store one bit of the payload data. In this case, the number of the ephemeral registers 392a, 392b, . . . , and 392n may be substantially equal to the bit number of the payload data.

According to one example embodiment, the main processor 320 may increase the count value included in the payload data based on the detection signal DS. In addition, if the count value exceeds the threshold value to activate the alarm signal AS, the main processor 320 may terminate the operation of the secure memory device 300, such as an operation for processing the secure data or an operation of deleting the secure data According to example embodiments, as described with reference to FIG. 7, when the fault is not injected in the secure memory device from the outside within a reference time period, the payload data may be initialized. In this case, the timer 370 may be used to measure the reference time period.

Although not illustrated in FIG. 2, the secure memory device 300 may further include an additional memory controller to control the volatile memory 340 and the non-volatile memory 350.

Figure 3:
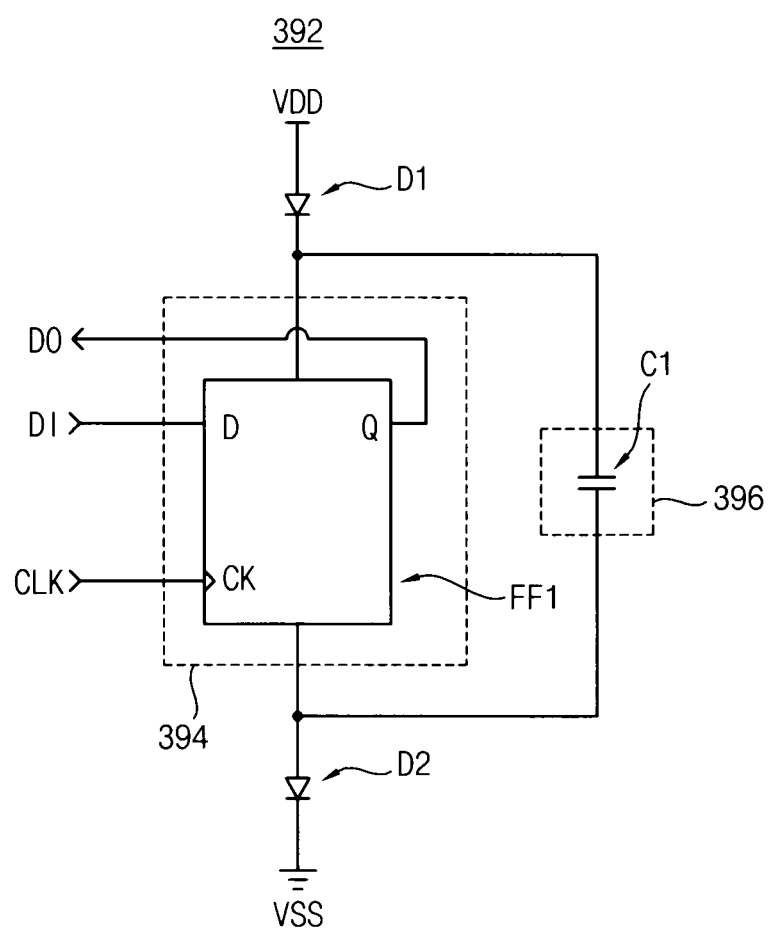
FIG. 3 is a circuit diagram illustrating one example of an ephemeral register constituting the secure memory device of the system illustrated in FIG. 2.

FIG. 3 is a circuit diagram illustrating one example of an ephemeral register constituting the secure memory device of the system illustrated in FIG. 2.

Referring to FIG. 3, an ephemeral register 392 may include a storage block 394, a first diode D1, a second diode D2, and a power supply block 396.

The storage block 394 may store at least one of the bits constituting the payload data. For instance, the storage block 394 may include a flip-flop FF1 that latches an input signal D1 and generates an output signal DO in response to a clock signal CLK. According to the example embodiment, set and reset inputs of the flip-flop FF1 may not be used. In this case, the storage block 394 may include a latch instead of the flip-flop FF1. Although not illustrated in FIG. 3, the storage block 394 may be implemented in the form of a predetermined memory or a predetermined memory array to store at least one bit.

The first diode D1 may be connected between the storage block 394 and a terminal of a first voltage VDD (e.g., a power supply voltage). The second diode D2 may be connected in parallel between the storage block 394 and a terminal of a second voltage VSS (e.g., a ground voltage). The power supply block 396 may be connected with the storage block 394 in parallel to supply power to the storage block 394. For instance, the power supply block 396 may include a capacitor C1. Although not illustrated in FIG. 3, the power supply block 396 may be implemented in the form of a predetermined embedded battery.

As described above, unlike a related art volatile memory, the ephemeral register 392 may store at least one of the bits constituting the payload data for a predetermined data retention time even if power is shut off. In other words, when power is supplied to the secure memory device 300, the storage block 394 stably receives power from the supply voltage VDD to store at least one of the bits constituting the payload data. After power supplied to the secure memory device 300 has been shut off, the storage block 394 may store at least one of the bits, constituting the payload data, for the data retention time based on the power supplied from the power supply block 396. To this end, an anode terminal of the first diode D1 may be connected with the terminal of the supply voltage VDD, and a cathode terminal of the second diode D2 may be connected with the terminal of the ground voltage VSS.

According to one example embodiment, the data retention time of the ephemeral register 392 may be determined according to the structure of the storage block 394 and the characteristic of storing charges in the power supply block 396. For example, the data retention time may be increased as the charge storage capacity of the power supply block 396 is increased, and may be varied depending on the detailed structure of the storage block 394. For example, the data retention time may be determined within the range of about one second to about ten seconds.

Figure 4:
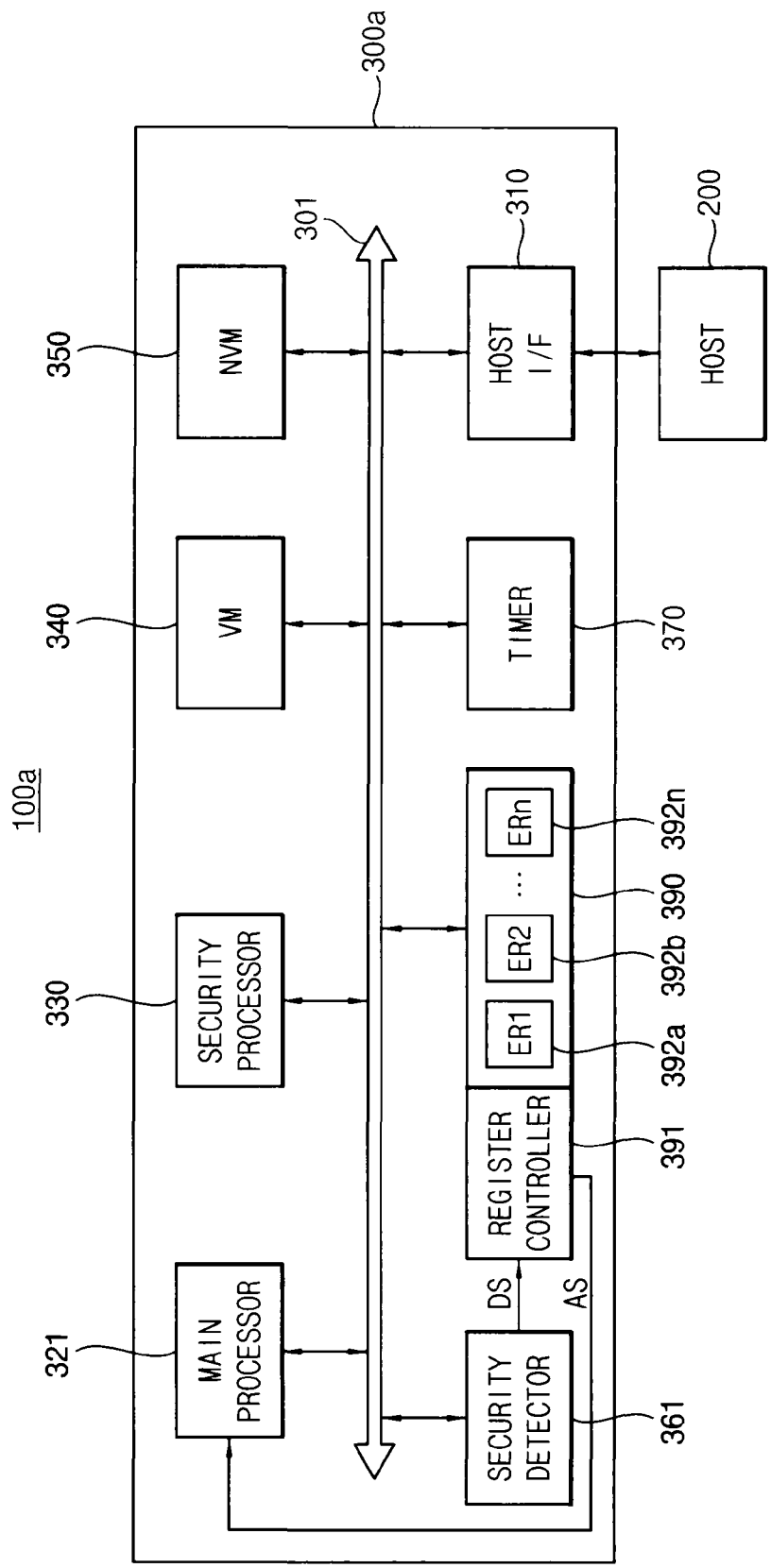
FIG. 4 is a block diagram illustrating a system including a secure memory device according to another exemplary embodiment.

FIG. 4 is a block diagram illustrating a system including a secure memory device according to another example embodiment.

Referring to FIG. 4, a system 100a includes the host 200 and a secure memory device 300a.

The secure memory device 300a includes a host interface (I/F) 310, a main processor 321, the security processor 330, the volatile memory (VM) 340, the non-volatile memory (NVM) 350, a security detector 361, the timer 370, the register unit 390, and a register controller 391. The components may be electrically connected with each other through the internal bus 301 to receive/send signals.

The secure memory device 300a of FIG. 4 may have substantially the same structure as that of the secure memory device 300 of FIG. 1, except that the secure memory device 300a further includes the register controller 391. Accordingly, the structure and components of the secure memory device 300a, the same as those of the secure memory device 300, will not be further described below in order to avoid redundancy.

The security detector 360 may detect if the fault is injected from the outside, to generate the detection signal DS. The register controller 391 may increase the count value included in the payload data based on the detection signal DS, and may generate the alarm signal AS to represent the fault attack. The main processor 321 may terminate the operation of the secure memory device 300a when the count value exceeds the threshold value to activate the alarm signal AS.

The secure memory device 300a of FIG. 4 additionally includes the register controller 391 that controls the register 390, and generates the alarm signal AS, thereby reducing the load of the main processor 321.

Figure 5:
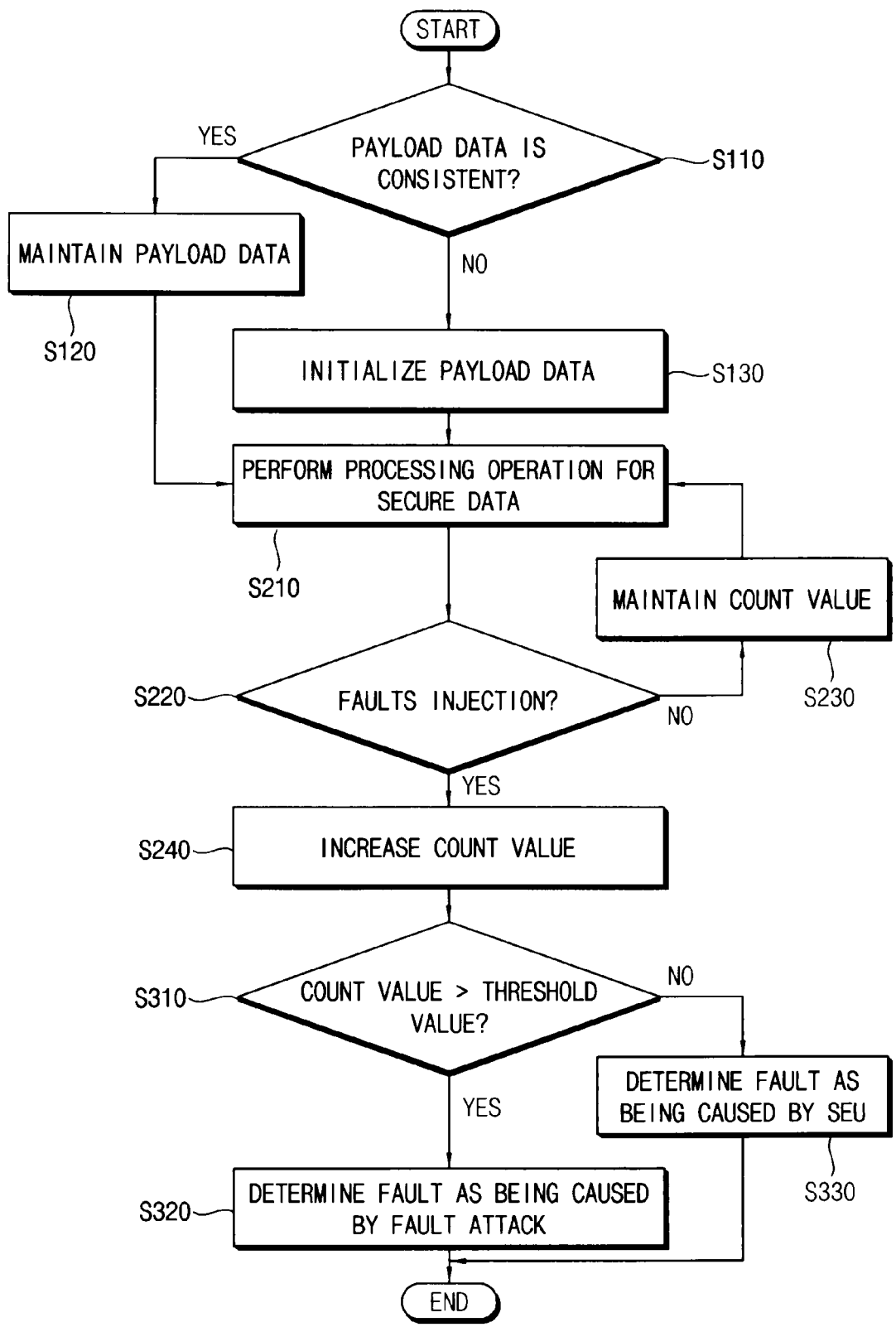
FIG. 5 is a flowchart illustrating one example of the method of detecting the fault attack of FIG. 1 according to one exemplary embodiment.

FIG. 5 is a flowchart illustrating one example of the method of detecting the fault attack of FIG. 1 according to one exemplary embodiment.

Referring to FIGS. 1 to 5, to selectively initialize the payload data (see step S100 of FIG. 1), the consistency of the payload data may be determined when power is supplied to the secure memory device or when the operation of the secure memory device is reset (step S110). As described above, the payload data may include the count value, and the EDC value corresponding to the count value. The main processor (320 of FIG. 2) or the register controller (391 of FIG. 4) may determine whether a first count bit of the plurality of count bits constituting the count value matches with first EDC bits of the plurality of EDC bits constituting the EDC value. The first EDC bits may correspond to the first count bit.

Figure 6A:
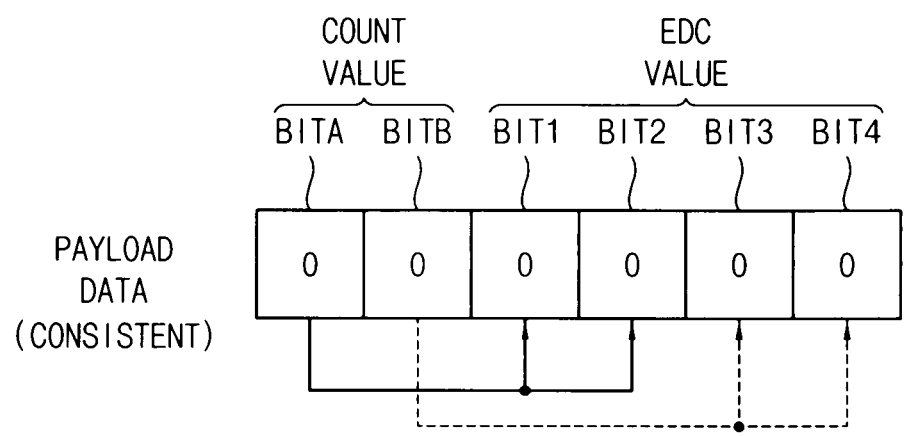
FIGS. 6A, 6B, and 6C are diagrams to explain the method of detecting the fault attack of FIG. 5.
Figure 6B:
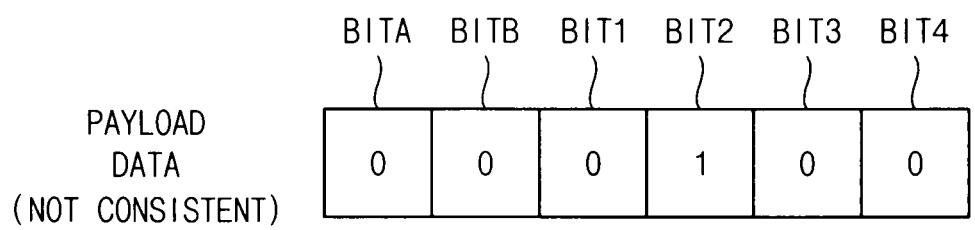
Figure 6C:
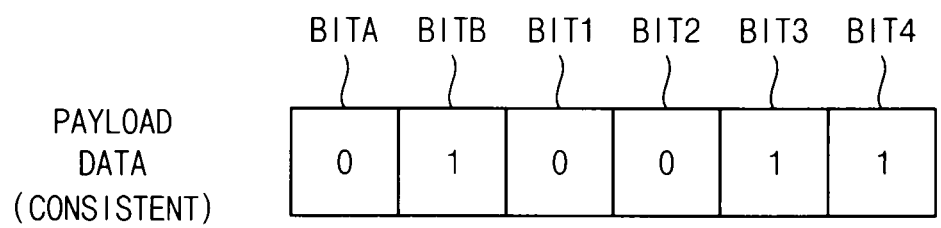

FIGS. 6A, 6B, and 6C are diagrams to explain the method of detecting the fault attack of FIG. 5.

Referring to FIGS. 6A and 6C, the count value of the payload data may include a plurality of count bits BITA and BITB, and the EDC value of the payload data may include a plurality of EDC bits BIT1, BIT2, BIT3, and BIT4. The first count bit BITA may correspond to the first EDC bits BIT1 and BIT2, and the second count bit BITB may correspond to the second EDC bits BIT3 and BIT4.

According to one example embodiment, the EDC bits may be generated by duplicating the corresponding count bit. Normally, the EDC bits may substantially match with the corresponding count bit. For instance, as shown in FIG. 6A, if the count value is '00', the first EDC bits BIT1 and BIT2 are generated by duplicating '0' which is the value of the first count bit BITA, and the second EDC bits BIT3 and BIT4 may be generated by duplicating '0' which is the value of the second count bit BITB. In addition, as shown in FIG. 6C, if the count value is '01', the first EDC bits BIT1 and BIT2 are generated by duplicating '0' which is the value of the first count bit BITA, and the second EDC bits BIT3 and BIT4 may be generated by duplicating '1' which is the value of the second count bit BITB. Accordingly, the first count bit BITA may substantially match with the first EDC bits BIT1 and BIT2, and the second count bit BITB may substantially match with the second EDC bits BIT3 and BIT4. In this case, the payload data may be determined as being consistent.

Referring to FIG. 6B, when power is supplied to the secure memory device after the power supplied to the secure memory device has been shut off and the data retention time of the ephemeral register 392 has elapsed, the EDC bits may not match with the corresponding count bit. In other words, after the data retention time has elapsed, the value stored in the ephemeral register 392 may change. For instance, as shown in FIG. 6B, although the value of the first count bit BITA is '0', one (BIT2) of the first EDC bits may have the value '1', which does not match with the value of the first count bit BITA. In this case, the payload data may be determined as being inconsistent.

Although FIGS. 6A, 6B, and 6C illustrate that the count value has 2-bit data, and one count bit corresponds to two EDC bits, the count value and the EDC value may be data having predetermined bits, according to another example embodiment.

Referring back to FIG. 5, if the payload data is determined as being consistent (step S110: Yes), i.e., if the count bit substantially matches with the corresponding EDC bits, the main processor (320 of FIG. 2) or the register controller (391 of FIG. 4) may maintain the payload data at a previous logic state (step S120).

If the payload data are determined as being inconsistent (step S110: No), i.e., if the count bit mismatches with the corresponding EDC bits, the main processor (320 of FIG. 2) or the register controller (391 of FIG. 4) may initialize the payload data (step S130). For example, as shown in FIG. 6A, the main processor (320 of FIG. 2) or the register controller (391 of FIG. 4) may initialize the payload data by initializing the count value as '00', and generating the EDC value corresponding to the count value.

In other words, according to the method of detecting the fault attack of example embodiments, when the secure memory device is powered on within the data retention time of the ephemeral register 392 after being powered off, the payload data may be maintained at the previous logic state. In addition, when the secure memory device is powered on beyond the data retention time of the ephemeral register 392 after being powered off, the payload data may be initialized.

To selectively increase the count value (step S200 of FIG. 1), the main processor (320 of FIG. 2 or 321 of FIG. 4) and/or the security processor 330 may perform a processing operation for the secure data (step S210). The security detector (360 of FIG. 2 or 361 of FIG. 4) may detect if the fault is injected from the outside during the processing operation for the secure data (step S220), and may generate the detection signal DS.

If the fault is not injected from the outside (step S220: No), i.e., if the detection signal DS is deactivated, the main processor (320 of FIG. 2) or the register controller (391 of FIG. 4) may maintain the count value to a previous value (step S230), and the main processor (320 of FIG. 2 or 321 of FIG. 4) and/or the security processor 330 may continue to perform the processing operation for the secure data.

If the fault is injected from the outside (step S220: Yes), i.e., if the detection signal DS is activated, the main processor (320 of FIG. 2) or the register controller (391 of FIG. 4) may increase the count value (step S240). For instance, if the previous value is '00', the count value is increased to '01' as illustrated in FIG. 6C, so that the payload data may have the value of '010011'. Although not illustrated, if the previous value is '01', the count value is increased '10', so that the payload data may have the value of '101100'.

To detect if faults injected from the outside is caused by fault attack (step S300 of FIG. 1), the security detector (360 of FIG. 2) or the register controller (391 of FIG. 1) may compare the count value with the threshold value (step S310) to generate the alarm signal AS.

If the count value is greater than the threshold value (step S310: Yes), i.e., if faults exceeding a present frequency are injected into the secure memory device to activate the alarm signal AS, the main processor (320 of FIG. 2 or 321 of FIG. 4) may determine the faults injected from the outside as being caused by the fault attack (step S320). If the count value is less than or equal to the threshold value (step S310: No), i.e., if faults are injected into the secure memory device at the preset frequency or less to deactivate the alarm signal AS, the main processor (320 of FIG. 2 or 321 of FIG. 4) may determine the faults injected from the outside are caused by the SEU (step S330).

According to one example, the threshold value may be determined depending on a soft error rate (SER) of the secure memory device. For instance, as the threshold value is increased, the occurrence frequency of the false alarm against the fault attack may be reduced.

As described above, according to the method of detecting the fault attack of FIG. 5, the fault attack can be effectively distinguished from the SEU by using the payload data stored in the plurality of ephemeral registers retaining data within a shorter time, even if power supplied to the registers is shut off. In addition, the selective initialization operation of the payload data, the selective increase operation of the count value, and the determination operation of the fault attack are repeatedly performed whenever starting supplying power to the secure memory device and/or whenever resetting the secure memory device (i.e., the number of times of powering on/off the secure memory device is tracked). Thus, the fault attack is distinguished from the SEU.

Figure 7:
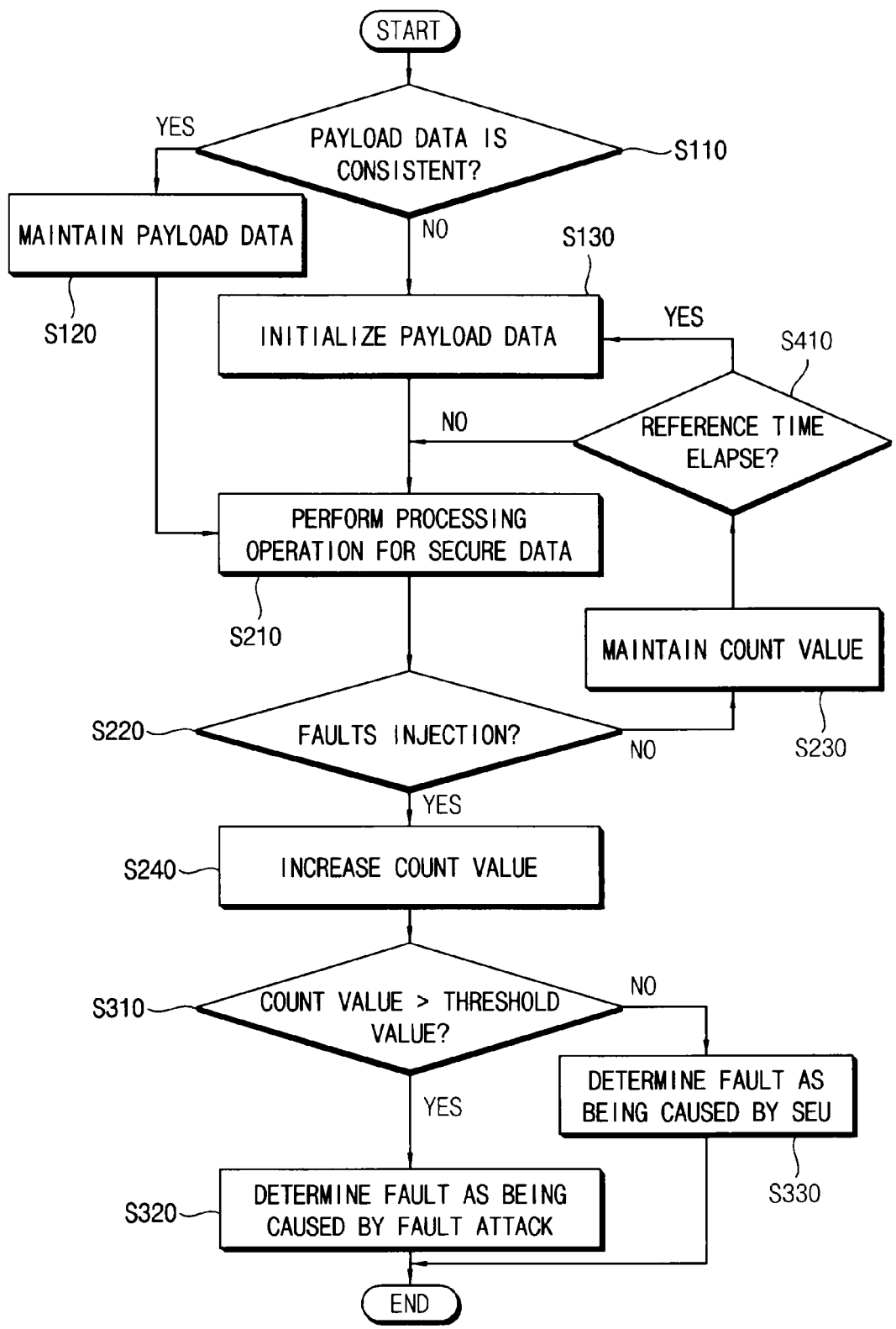
FIG. 7 is a flowchart illustrating another example of the method of detecting the fault attack of FIG. 1 according to one exemplary embodiment.

FIG. 7 is a flowchart illustrating another example of the method of detecting the fault attack of FIG. 1 according to another example embodiment.

The method of detecting the fault attack of FIG. 7 may be substantially the same as that of FIG. 5 except that the method of detecting the fault attack of FIG. 7 further includes a step of initializing the payload data when the faults are not injected from the outside, within the reference time period. In other words, the steps S110, S120, S130, S210, S220, S230, S240, S310, S320 and S330 of FIG. 7 may be substantially the same as the steps S110, S120, S130, S210, S220, S230, S240, S310, S320 and S330 of FIG. 5.

Referring to FIG. 7, after the faults are not injected from the outside during the processing operation for the secure data (step S220: No) so that the count value is maintained as the previous value (step S230), the timer 370 may determine if the reference time period has elapsed (step S410) and activate a time-out signal.

If the reference time period has not elapsed (step S410: No), i.e., if the time-out signal is deactivated, the main processor (320 of FIG. 2 or 321 of FIG. 4) and/or the security processor 330 may continuously perform the processing operation for the secure data.

If the reference time period has elapsed (step S410: Yes), i.e., if faults are not injected from the outside during the reference time period so that the time-out signal is activated, the main processor (320 of FIG. 2) or the register controller (391 of FIG. 4) may initialize the payload data (step S130), and the main processor (320 of FIG. 2, or 321 of FIG. 4) and/or the security processor 330 may continue to perform the processing operation for the secure data.

When the fault attack is frequently attempted, the power supplied to the secure memory device is shut off, or the operation of the secure memory device is reset between the attempts of the fault injection. However, the fault attack may be attempted during continuously supplying power to the secure memory device. When the secure memory device is continuously powered on, if fault injection is detected multiple times within short time, the probability of the fault attack is relatively high. However, if the interval between the attempts of the fault injection is lengthened, the probability in which the injected faults are caused by the SEU is high. As shown in FIG. 5, when the count value is increasingly accumulated, the false alarm against the fault attack may occur.

The method of detecting the fault attack of FIG. 7 further includes a step of initializing the payload data and the count value contained in the payload data, when faults are not injected from the outside for the reference time, thereby reducing the occurrence frequencies of the false alarm against the fault attack, even if the secure memory device is continuously powered on.

Figure 8:
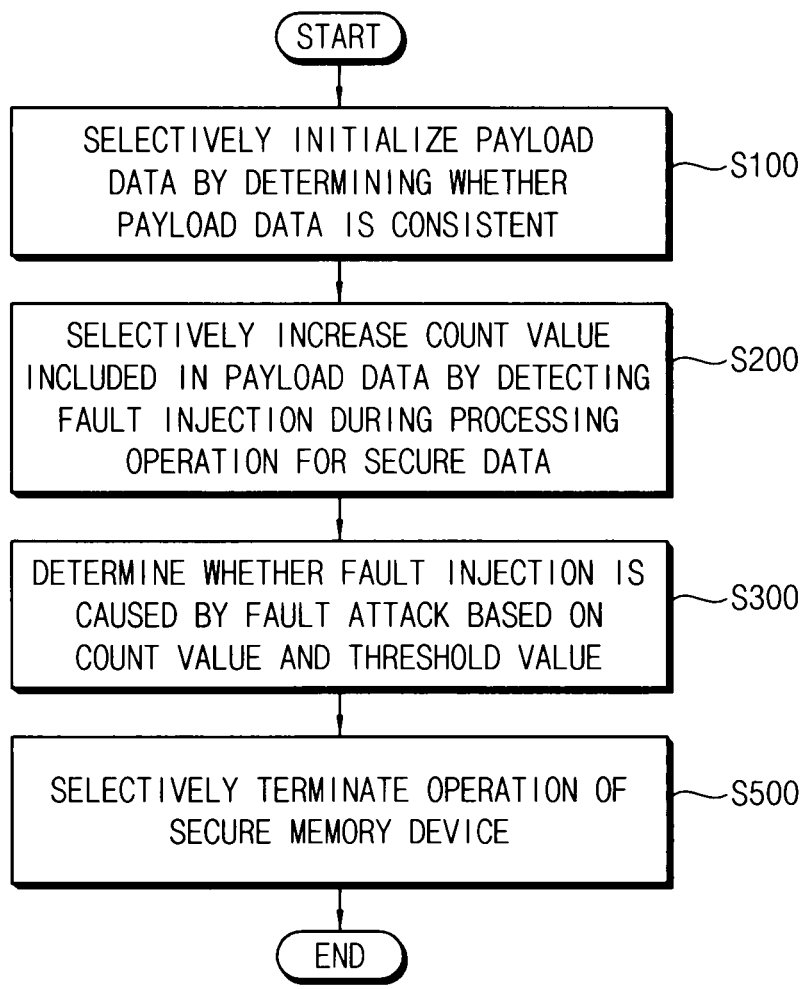
FIG. 8 is a flowchart illustrating a method of detecting a fault attack according to another exemplary embodiment.

FIG. 8 is a flowchart illustrating a method of detecting a fault attack according to another example embodiment.

Referring to FIG. 8, according to the method of detecting a fault attack according to another example embodiment, the consistency of the payload data is determined, so that the payload data is selectively initialized (step S100). Then, it is detected if faults are injected from the outside during the processing operation for the secure data, stored in the secure memory device to selectively increase the count value contained in the payload data (step S200). Next, it is determined if the faults injected from the outside are caused by the fault attack, based on the count value and the threshold value (step S300). The operation of the secure memory device is selectively terminated based on the determination result (step S500).

The method of detecting the fault attack of FIG. 8 may be substantially the same as that of FIG. 1, except that the method of detecting the fault attack of FIG. 8 further includes a step of selectively terminating the operation of the secure memory device. In other words, the steps S100, S200, and S300 of FIG. 8 may be substantially the same as the steps S100, S200, and S300 of FIG. 1.

Figure 9:
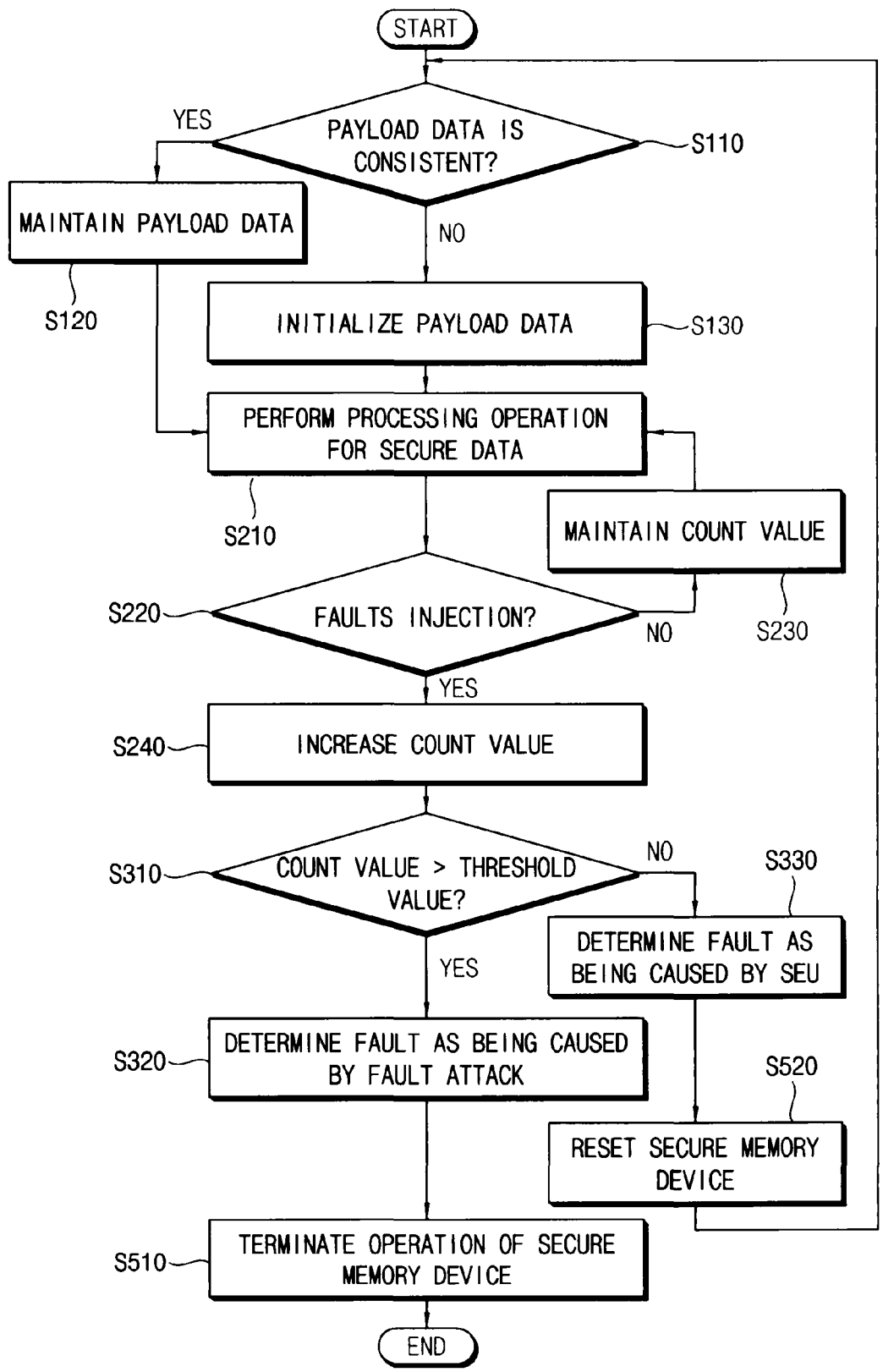
FIG. 9 is a flowchart illustrating one example of the method of detecting the fault attack of FIG. 8.

FIG. 9 is a flowchart illustrating one example of the method of detecting the fault attack of FIG. 8.

The steps S110, S120, S130, S210, S220, S230, S240, S310, S320, and S330 of FIG. 9 may be substantially the same as the steps S110, S120, S130, S210, S220, S230, S240, S310, S320, and S330 of FIG. 5.

Referring to FIGS. 8 and 9, when the operation of secure memory device (step S500 of FIG. 8) is selectively operated, if the faults injected from the outside are determined as being caused by the fault attack, the main processor (320 of FIG. 2, or 321 of FIG. 4) may terminate the operation of the secure memory device (step S510). For instance, the main processor (320 of FIG. 2 or 321 of FIG. 4) may stop the processing of the secure data or delete the secure data.

If the faults injected from the outside are determined as being caused by the SEU, the main processor (320 of FIG. 2 or 321 of FIG. 4) may reset the operation of the secure memory device (step S520), and the secure memory device may perform the selective initialization operation of the payload data, the selective increase operation of the count value, and the determination operation of the fault attack again. When the SEU occurs, errors occur in the secure data due to the injected faults, so that the processing operation for the secure data may not be successfully performed. Accordingly, the method of detecting the fault attack is repeated from the first stage, so that the processing operation for the secure data can be successfully performed.

According to the embodiment, the method of detecting the fault attack of FIG. 9 may further include a step of initializing the payload data when faults are not injected from the outside for the reference time described with reference to FIG. 7.

Figure 10:
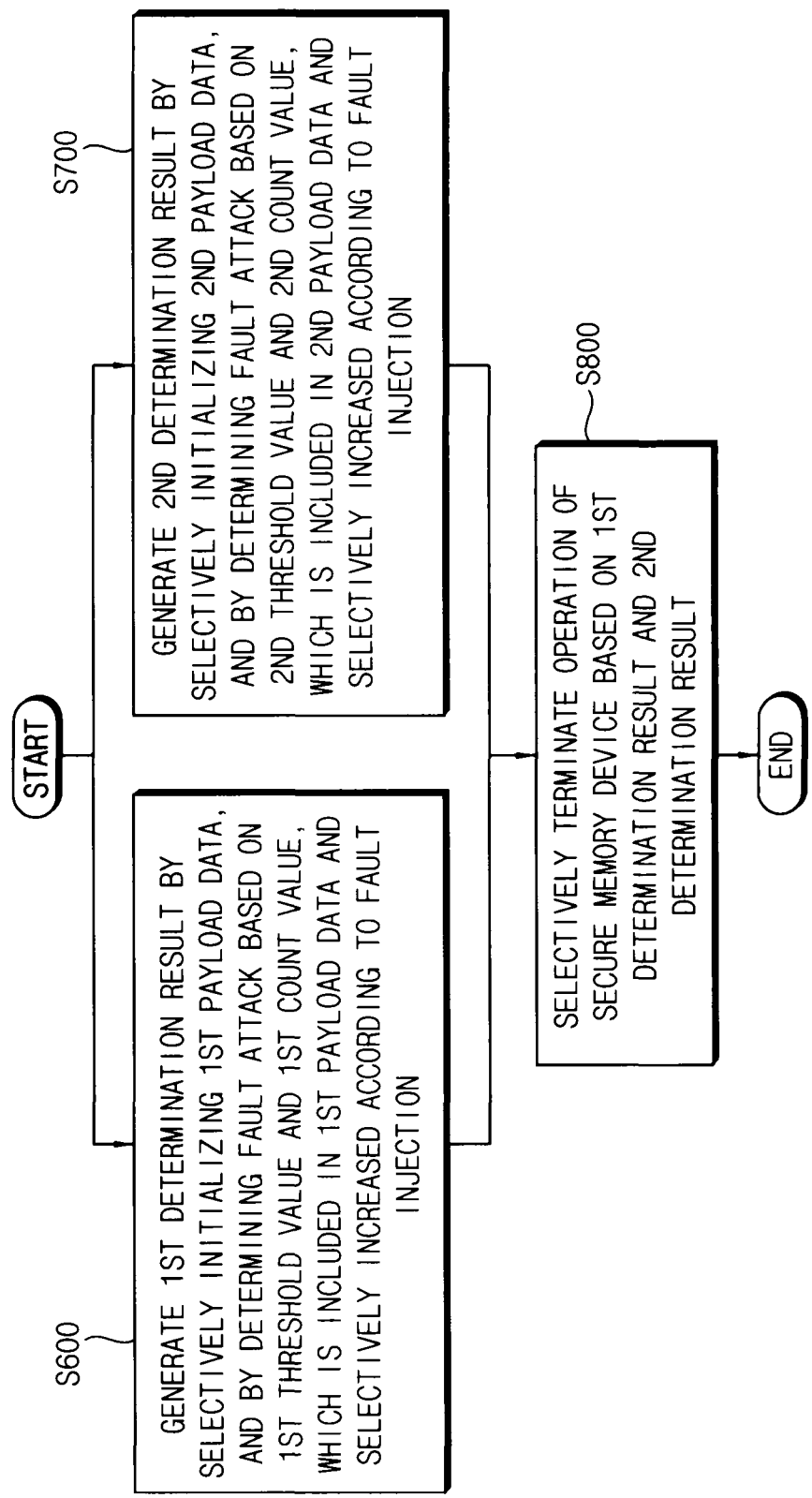
FIG. 10 is a flowchart illustrating a method of detecting a fault attack according to still another exemplary embodiment.

FIG. 10 is a flowchart illustrating a method of detecting a fault attack according to still another example embodiment.

Referring to FIG. 10, according to the method of detecting the fault attack according to still another embodiment, the consistency of first payload data is determined, so that the first payload data is selectively initialized. Then, it is detected if faults are injected from the outside during the processing operation for the secure data to selectively increase a first count value contained in the first payload data. Next, it is determined if the faults injected from the outside are caused by the fault attack, based on the first count value and a first threshold value, thereby generating a first determination result (step S600). The first payload data may be stored in a plurality of first ephemeral registers constituting the secure memory device, and may be used to detect the fault attack. The step S600 of FIG. 10 may be substantially the same as the method of detecting the fault attack of FIG. 1 except that the step S600 of FIG. 10 employs the first payload data and the first threshold value. The step S600 of FIG. 10 may be performed in the same manner as those of the embodiments illustrated in FIG. 5 or 7.

The consistency of a second payload data is determined, so that the second payload data is selectively initialized. Then, it is detected if faults are injected from the outside during the processing operation for the secure data to selectively increase a second count value contained in the second payload data. Next, it is determined if the faults injected from the outside are caused by the fault attack, based on the second count value and a second threshold value, thereby generating a second determination result (step S700). The second payload data may be stored in a plurality of second ephemeral registers constituting the secure memory device, and may be used to detect the fault attack. The data retention time of the second ephemeral registers is different from the data retention time of the first ephemeral registers, and the second threshold value is different from the first threshold value. The step S700 of FIG. 10 may be substantially the same as the method of detecting the fault attack of FIG. 1, except that the step S700 of FIG. 10 employs the second payload data and the second threshold value. The step S700 of FIG. 10 may be performed in the same manner as those of the embodiments illustrated in FIG. 5 or 7. In addition, the steps S600 and S700 of FIG. 10 may be simultaneously performed.

The operation of the secure memory device is selectively terminated based on the first and second determination results (step S800). For instance, the operation of the secure memory device may be terminated when the fault attack is determined as being attempted in step S600, when the fault attack is determined as being attempted in step S700, and when the fault attack is determined as being attempted in steps S600 and S700, the operation of the secure memory device may be terminated.

According to the method of detecting the fault attack of FIG. 10, the fault attack is detected by using the first and second payload data, which are different from each other and stored in the first and second ephemeral registers having different data retention times. Particularly, the fault attack is detected by using the first and second count values different from each other, and the first and second threshold values different from each other, which are contained in the first and second payload data. In other words, two different conditions to distinguish between the fault attack and the SEU are set, and, when at least one of the two conditions is satisfied, the faults injected from the outside are determined as being caused by the fault attack. Accordingly, the occurrence frequency of the false alarm against the fault attack can be reduced, and the fault attack can be effectively distinguished from the SEU.

Although not illustrated, according to the example embodiment, the fault attack may be detected by using a plurality of different count values and a plurality of different threshold values, which are contained in a plurality of different payload data. In other words, a plurality of different conditions to distinguish between the fault attack and the SEU are set. When at least one of the plural different conditions is satisfied, the faults injected from the outside are determined as being caused by the fault attack.

Figure 11:
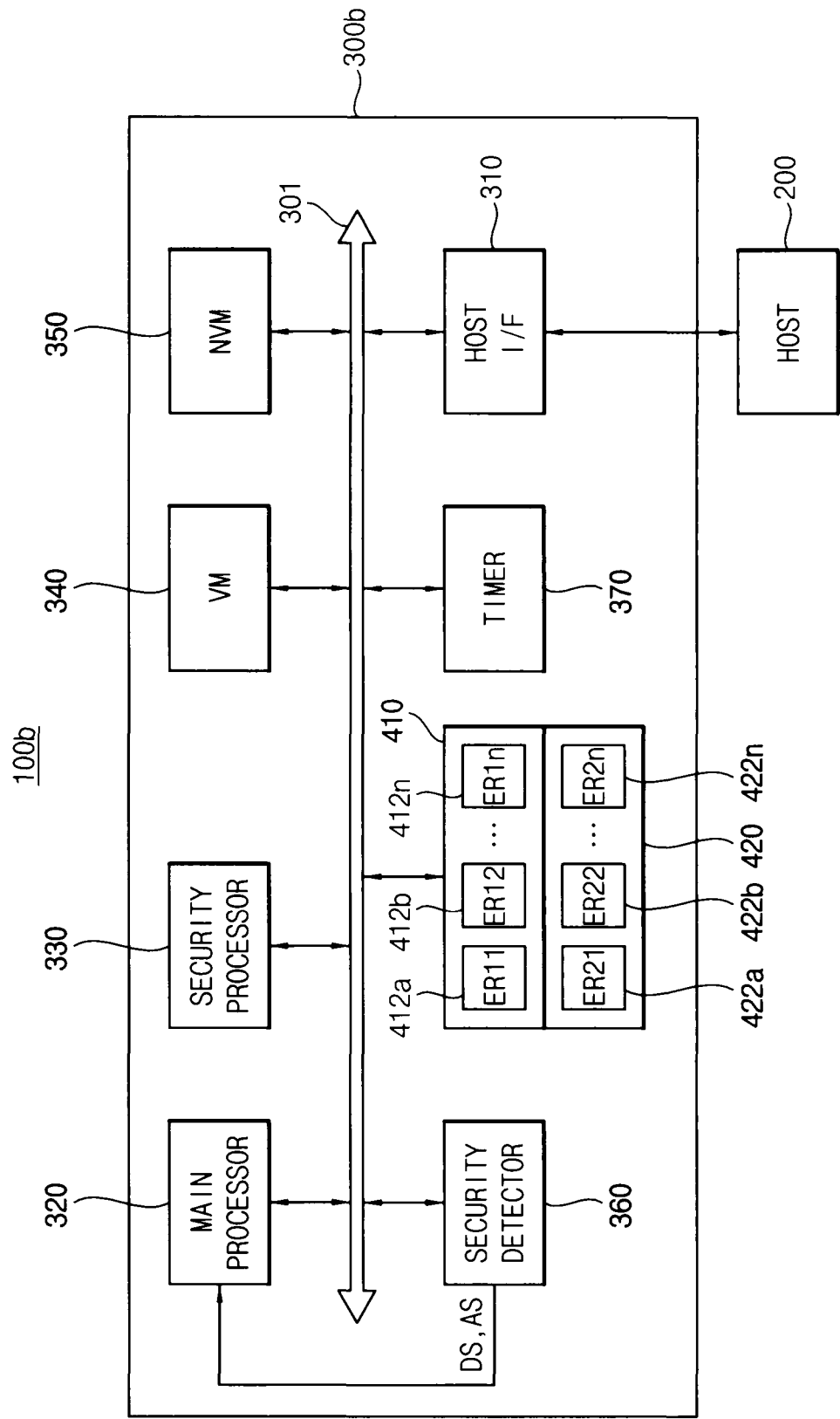
FIG. 11 is a block diagram illustrating a system including a secure memory device according to still another exemplary embodiment.

FIG. 11 is a block diagram illustrating a system including a secure memory device according to still example embodiment.

Referring to FIG. 11, a system 100b includes the host 200 and a secure memory device 300b.

The secure memory device 300b includes the host interface 310, the main processor 320, the security processor 330, the volatile memory 340, the non-volatile memory 350, the security detector 360, the timer 370, a first register unit 410, and a second register unit 420. The components are electrically connected with each other through the internal bus 301 to receive/send signals.

The secure memory device 300b of FIG. 11 is substantially the same as the secure memory device 300 of FIG. 1, except that the secure memory device 300b of FIG. 11 includes two registers 410 and 420.

The first register unit 410 may store the first payload data used in the step S600 of FIG. 10, and may include a plurality of first ephemeral registers 412a, 412b, ..., and 412n in order to detect the fault attack. The second register unit 420 may store the second payload data used in the step S700 of FIG. 10, and may include a plurality of second ephemeral registers 422a, 422b, ..., and 422n in order to detect the fault attack.

The data retention time of the first ephemeral registers 412a, 412b, ..., and 412n may be different from the data retention time of the second ephemeral registers 422a, 422b, ..., and 422n. For instance, the data retention time of the second ephemeral registers 422a, 422b, ..., and 422n may be longer than the data retention time of the first ephemeral registers 412a, 412b, ..., and 412n. In this case, the second threshold value may be greater than the first threshold value.

As shown in FIG. 4, according to the example embodiment, the secure memory device may further include a register controller. Although not illustrated, when detecting the fault attack by using a plurality of different payload data, the secure memory device may include a plurality of register units.

Figure 12:
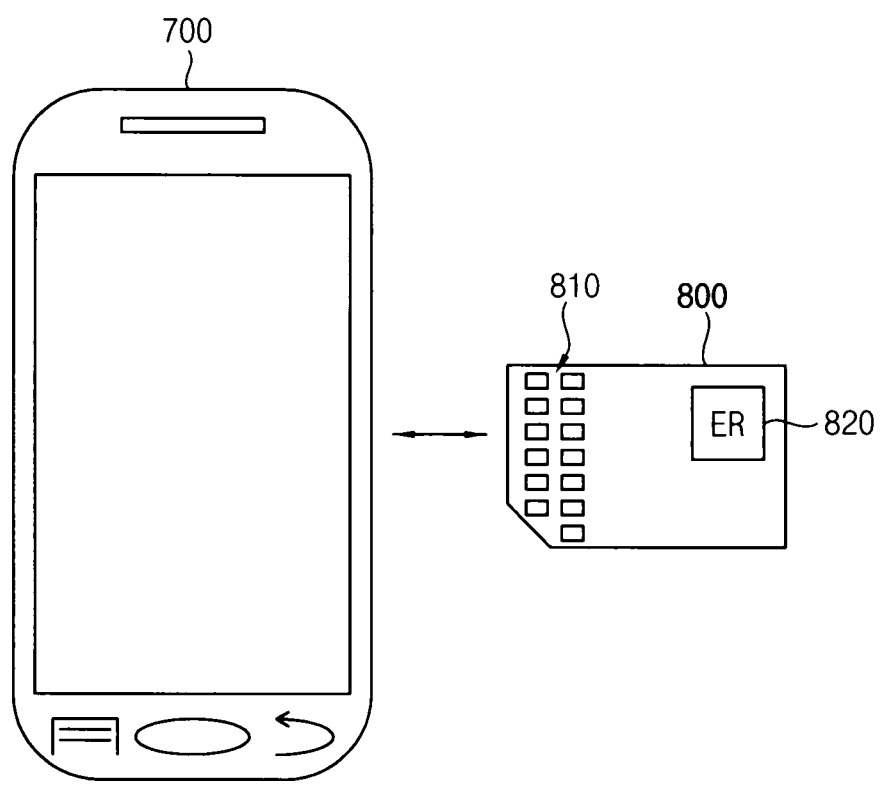
FIG. 12 is a diagram illustrating an application example of the secure memory device to a mobile appliance according to exemplary embodiments.

FIG. 12 is a diagram illustrating an application example of the secure memory device to a mobile appliance according to example embodiments.

Referring to FIG. 12, a system includes a mobile appliance 700 and a secure memory device 800.

The secure memory device 800 includes a plurality of connection pins 810 and an ephemeral register 820. Although not illustrated, the secure memory device 800 may further include an internal bus, a host interface, a main processor, a security processor, a volatile memory, a non-volatile memory, a security detector, and a timer.

The connection pins 810 may be connected to the mobile appliance 700 so that signals may be transmitted and received between the mobile appliance 700 and the secure memory device 800. The connection pins 810 may include a clock pin, a command pin, a data pin and/or a reset pin.

The ephemeral register 820 stores the payload data in order to detect the fault attack. As described above with reference to FIGS. 1 to 11, the secure memory device 800 can effectively distinguish between the fault attack and the SEU by repeatedly performing the selective initialization operation of payload data, the selective increase operation of a count value contained in the payload data, and the determination operation of the fault attack whenever power is supplied to the secure memory device 800, whenever resetting the secure memory device 800, and/or in the state that the secure memory device 800 is continuously powered on.

The secure memory device 800 may be a memory card, such as a multimedia card (MMC), an embedded MMC (eMMC), a hybrid eMMC, a secure digital (SD) card, a micro-SD card, a memory stick, an ID card, a personal computer memory card international association (PCMCIA) card, a chip card, an USB card, a smart card, a compact flash (CF) card, etc.

According to example embodiments, the mobile appliance 700 may be any mobile system, such as a mobile phone, a smart phone, a tablet computer, a laptop computer, a PDA, a PMP, a digital camera, a portable game console, a music player, a camcorder, a video player, a navigation system, etc.

Although the above description has been made regarding the method of detecting the fault attack, which is attempted through the repeated power on/off operation, by using the payload data stored in the ephemeral register, various attacks such as side channel analysis and/or dictionary attacks attempted under the normal condition without the power perturbation can be defended using the ephemeral register. For instance, the ephemeral register may be used as a counter to increase a count value whenever main data are used. If the count value has a very large value exceeding a preset reference value, the operating speed of the secure memory device may be reduced or the secure memory device may be operated in the sleep state for preset time. Accordingly, time to collect the information required to perform the side channel analysis and/or the fault attack may be increased to effectively defend the side channel analysis and/or the fault attack.

The example embodiments are applicable to various devices and various systems that process secure data and requires security. For instance, the example embodiments are applicable to various mobile appliances, such as a mobile phone, a smart phone, a tablet PC, a laptop computer, a personal digital assistant (PDA), a portable multimedia player (PMP), a digital camera, a music player, a portable game console, and a navigation.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present exemplary embodiments. Accordingly, all such modifications are intended to be included within the scope of the present exemplary embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of detecting a fault attack in a secure memory device, the method comprising:
   initializing payload data by determining whether the payload data is consistent, the payload data being stored in a plurality of ephemeral registers included in the secure memory device;
   increasing a count value included in the payload data by detecting whether a fault is injected in the secure memory device from outside, during a processing operation of secure data, stored in the secure memory device; and
   determining whether the fault injected in the secure memory device from the outside is caused by the fault attack based on the count value and a threshold value.

2. The method of claim 1, wherein the payload data further includes an error detection code (EDC) value corresponding to the count value, the count value includes a plurality of count bits, and the EDC value includes a plurality of EDC bits, and
   wherein the initializing the payload data comprises:
   determining whether a first count bit of the plurality of count bits matches with first EDC bits of the plurality of EDC bits, the first EDC bits corresponding to the first count bit.

3. The method of claim 2, wherein the initializing the payload data further comprises:
   maintaining the payload data at a previous logic state if the first count bit matches with the first EDC bits; and
   initializing the payload data if the first count bit does not match with the first EDC bits.

4. The method of claim 3, wherein the payload data is maintained at the previous logic state if the secure memory device is powered on within a data retention time of the ephemeral registers, and the payload data is initialized if the secure memory device is powered on after the data retention time of the ephemeral registers has elapsed.

5. The method of claim 1, wherein the increasing the count value comprises:
   maintaining the count value to a previous value if the fault is not injected in the secure memory device; and
   increasing the count value if the fault is injected in the secure memory device.

6. The method of claim 1, wherein the determining whether the fault is caused by the fault attack comprises:
   determining that the fault is caused by a single event upset (SEU) if the count value is less than or equal to the threshold value; and
   determining that the fault is caused by the fault attack if the count value is greater than the threshold value.

7. The method of claim 1, further comprising:
   initializing the payload data if the fault is not injected in the secure memory device from the outside within a reference time period.

8. The method of claim 1, further comprising:
   terminating the processing operation of the secure memory device.

9. The method of claim 8, wherein the terminating the processing operation of the secure memory device comprises:
   resetting the processing operation of the secure memory device if the fault is determined as being caused by a SEU; and
   terminating the processing operation of the secure memory device if the fault is determined as being caused by the fault attack.

10. The method of claim 9, wherein the secure memory device comprises:

a security detector which is configured to generate a detection signal by detecting whether the fault is injected in the secure memory device, and configured to generate an alarm signal indicating whether the fault is caused by the fault attack; and a processor which is configured to control the operation of the secure memory device, configured to increase the count value based on the detection signal, and configured to terminate the processing operation of the secure memory device based on the alarm signal.

11. The method of claim 9, wherein the secure memory device comprises:

a security detector which is configured to generate a detection signal by detecting whether the fault is injected in the secure memory device;

a register controller which is configured to increase the count value based on the detection signal, and configured to generate an alarm signal indicating whether the fault is caused by the fault attack; and a processor which is configured to control the operation of the secure memory device, and configured to terminate the processing operation of the secure memory device based on the alarm signal.

12. The method of claim 1, wherein each ephemeral register of the ephemeral registers comprise:

a storage block which is configured to store at least one of a plurality of bits included in the payload data;

a first diode which is connected between the storage block and a terminal of a first voltage;

a second diode which is connected between the storage block and a terminal of a second voltage; and a power supply block which is connected in parallel with the storage block, and supplies power to the storage block.

13. The method of claim 12, wherein the storage block comprises a flip-flop or a latch, and the power supply block comprises a capacitor.

14. The method of claim 12, wherein a data retention time of each ephemeral register is determined based on a structure of the storage block and a charge storage characteristic of the power supply block.

15. A method of detecting a fault attack in a secure memory device, the method comprising:

generating a first determination result, by initializing first payload data as a result of determining whether the payload data is consistent, increasing a first count value included in the first payload data as a result of detecting whether a fault is injected in the secure memory device from outside during a processing operation of secure data, stored in the secure memory device, and determining whether the fault is caused by the fault attack based on the first count value and a first threshold value, the first payload data being stored in a plurality of first ephemeral registers included in the secure memory device;

generating a second determination result, by initializing second payload data as a result of determining whether the second payload data is consistent, increasing a second count value included in the second payload data as a result of detecting whether the fault is injected in the secure memory device from the outside during the processing operation of the secure data, stored in the secure memory device, and determining whether the fault is caused by the fault attack based on the second count value and a second threshold value, different from the first threshold value, the second payload data being stored in a plurality of second ephemeral registers included in the secure memory device, and a data retention time of the second ephemeral registers being different from a data retention time of the first ephemeral registers; and terminating the processing operation of the secure memory device based on the first determination result and the second determination result.

16. A method of detecting a fault attack in a secure memory device, the method comprising:

determining whether a first count bit, of a plurality of count bits, matches with a plurality of first error detection code (EDC) bits corresponding with the first count bit;

initializing payload data if the first count bit does not match the first EDC bits;

detecting whether a fault is injected in the secure memory device from outside during a processing operation of the secure memory device;

increasing a count value included in the payload data when the fault is injected in the secure memory device; and determining whether the fault injected in the secure memory device from the outside in a single event upset (SEU) or the fault attack.

17. The method of claim 16, wherein the determining whether the fault injected in the secure memory device from the outside is the SEU occurs when the count value is less than or equal to a threshold value.

18. The method of claim 16, wherein the determining whether the fault injected in the secure memory device from the outside is the fault attack occurs when the count value is greater than a threshold value.

19. The method of claim 17, wherein when the fault injected is determined to be the SEU, resetting the processing operation of the secure memory device.

20. The method of claim 18, wherein when the fault injected is determined to be the fault attack, terminating the processing operation of the secure memory device.

* * * * *